United States Patent

[15] 3,658,597

Gray

[45] Apr. 25, 1972

[54] METHOD OF MAKING FUEL CELL ELECTROLYTE MATRIX

[72] Inventor: Foster L. Gray, Dallas, Tex.

[73] Assignee: Texas Instrument Incorporated, Dallas, Tex.

[22] Filed: Mar. 13, 1969

[21] Appl. No.: 806,901

[52] U.S. Cl....................136/148, 106/40, 106/57, 136/86, 264/43
[51] Int. Cl. .......................................................H01m 3/02
[58] Field of Search ..............136/86, 146, 153, 148; 106/57, 106/58, 40, 75; 264/42, 43, 63

[56] References Cited

UNITED STATES PATENTS

| | | | |
|---|---|---|---|
| 2,992,930 | 7/1961 | Wheeler et al............................106/40 |
| 3,120,456 | 2/1964 | Broers................................136/153 X |
| 3,174,881 | 2/1965 | McEvoy et al............................136/86 |
| 3,321,410 | 5/1967 | MacArthur et al. .................106/40 X |
| 3,490,953 | 1/1970 | Berger et al........................136/148 X |

*Primary Examiner*—Donald L. Walton
*Attorney*—Samuel M. Mims, Jr., James O. Dixon, Andrew M. Hassell, Harold Levine, Melvin Sharp and John M. Harrison

[57] ABSTRACT

A heat resistant porous fuel cell matrix for holding liquid electrolyte in fuel cells which can be subjected to extreme temperature conditions without cracking and permanently deforming is made from a ceramic metal oxide such as magnesia, a binder such as an alkali metal phosphate, and a liquid phase sintering agent for the metal oxides such as lithium fluoride. To form the matrix, the matrix molding composition is formed containing a thoroughly mixed composition of a major portion of the ceramic metal oxide, and minor portions of the binder and liquid phase sintering agent. The composition is molded into suitable matrix form, and the binding agent is activated such as by heating to form a porous green matrix which has structural integrity at room temperature. The porous green matrix is then heated to a temperature above the melting point of the liquid phase sintering agent to cause substantial sintering between the metallic oxide particles and yield a thermal resistant porous fuel cell matrix.

6 Claims, 3 Drawing Figures

Patented April 25, 1972 3,658,597

METHOD OF MAKING FUEL CELL ELECTROLYTE MATRIX

This invention relates to fuel cells in another aspect, this invention relates to an improved matrix for a fuel cell which will not crack or permanently distort when subjected to temperature extremes.

A conventional fuel cell configuration includes at least a pair of porous, conductive electrodes (at least one cathode and one anode) spaced apart and contacted by an electrolyte which is carried by a matrix of dielectric material, which provides a multiplicity of pores. In the operation of this cell, a suitable reactant gas is passed to each electrode and contacts electrolyte in the porous structure of each electrode to provide for cell reaction. Thus, at each electrode, a half cell chemical reaction occurs: Between reductant and electrolyte at one electrode and between oxidizer and electrolyte at the other electrode. These reactions create an electric potential between the electrodes, and thereby furnish electric power to an external circuit.

The present trend in fuel cell development is toward lighter, smaller, and thinner fuel cells. The trend has resulted in the development of closely spaced anodes and cathodes, and therefore, in very thin but uniform electrolyte containing matrices. It is generally necessary that the thin matrices utilized in the cells be uniform in thickness and porosity so that a substantially uniform contact of electrolyte is made with the surface of the electrodes.

One method of forming the thin matrices is initially to form a molding composition of matrix material and then apply this material uniformly on the surface of an electrode, for example, the anode. The cathode is then placed against the exposed surface of the matrix to form a fuel cell unit. The electrolyte can be added to the matrix by depositing electrolyte on the exposed matrix area between the electrodes. The electrolyte will then wick through and saturate the thin matrix between the electrodes.

While the older conventional matrix material comprises a multiplicity of finely divided ceramic material such as magnesium oxide particles, aluminum oxide particles, or lithium aluminate particles, the recently developed thin wall matrix material includes, in addition to the ceramic particles, binders such as silicates, phosphates, borates, and aluminates. These binders are generally necessary to give the thin matrices structural integrity (1) at room temperatures to facilitate fuel cell assembly, and (2) at the higher operating temperatures of the fuel cell.

Problems have occurred when using the newly developed thin matrices, particularly in conjunction with molten carbonate electrolyte fuel cells. It has been found, for example, that the molten carbonate electrolyte will react with some binder materials such as the silicates to form reaction products which in turn plug the pores of the matrix. This results in non-uniform contact of the electrolyte on the electrodes. Additionally, reaction of the electrolyte with most of these conventional binder materials will weaken and/or destroy their ability to bind the ceramic particles together, and prolonged high temperature usage will thereby yield the matrix soft during the fuel cell operation. This results in non-uniform contact between the matrix and the electrodes, especially in the applications where the matrix material is molded on a very rough or wavy surface of an electrode such as an anode.

In addition to the above described problems it has been found that these newly developed thin matrices which are bound together by the conventional binder materials will crack and/or permanently distort when subjected to extremely high temperatures, for example, 900° C. More specifically, in my copending application Ser. No. 806,838, filed on Mar. 13, 1969, there is disclosed a method of connecting electrodes in series by a brazing technique which generally requires fully assembled anodes carrying thin matrices to be assembled with cathodes by brazing techniques which subject the assembled anode, matrix, and cathodes to a temperature of at least 900° C. The thin matrices which are bound by the conventional binders crack and sometimes permanently distort because of this thermal cycling.

Therefore, one object of this invention is to provide improved matrix for fuel cells and method for making the same.

Another object of this invention is to provide a matrix for fuel cells which will maintain its structural integrity when subjected to extreme thermal cycling prior to the time that it has been impregnated with electrolyte.

A further object of this invention is to provide an improved fuel cell matrix which will maintain its structural integrity after it has been operated for extended periods of time in a fuel cell when impregnated with electrolyte.

According to one embodiment of this invention, a porous ceramic fuel matrix is provided which consists of ceramic metal oxide particles held together at least partially by self-bonds induced by liquid phase sintering and at least partially by a dissimilar binding agent.

According to another embodiment of this invention, a process of making the above described matrix is provided whereby matrix molding mixture is initially formed which consists of a major effective portion of a ceramic metal oxide, a minor effective portion of a binding agent for consolidating the ceramic particles into a porous mass, and a minor effective portion of a liquid phase sintering agent for the ceramic metal oxide particles; the molding mixture is formed into the desired matrix shape and the binder agent is activated to hold the particles in a consolidated relationship in the molded shapes; and lastly, the molded porous matrix is heated to a sintering temperature of the ceramic metal oxide particles above the melting point of the liquid phase sintering agent, and the ceramic metal particles are thereby at least partially self-bonded.

This invention can be more easily understood from a study of the drawings in which.

Figure 1:
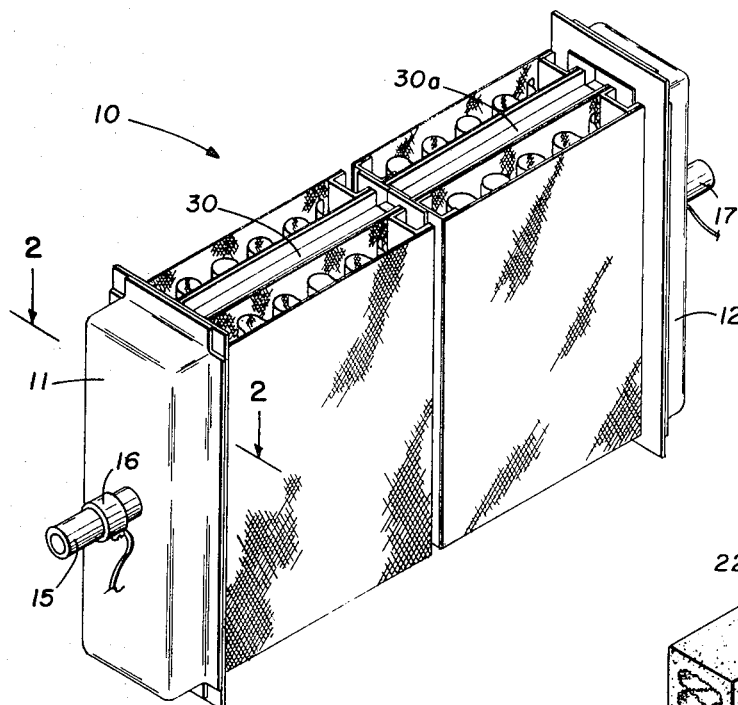
FIG. 1 is a perspective view of a conventional fuel cell containing the improved matrices of this invention.
Figure 2:
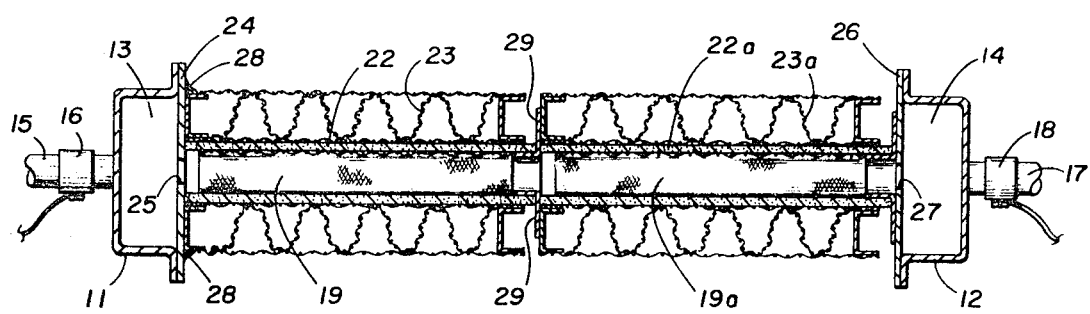
FIG. 2 is a sectional view along lines 2—2 of FIG. 1.

Now referring to FIGS. 1 and 2, fuel cell unit 10 generally comprises a multicell power package incorporating fuel cells interconnected in series, and in parallel. FIGS. 1 and 2 are given for illustrative purposes only to illustrate the improved matrix of this invention. Thus, the number of fuel cells in Unit 10 together with the electrical interconnections therebetween is not intended to limit the scope of this invention.

Enclosures 11 and 12 which carry cavities 13 and 14, respectively, are connected at opposite ends of fuel cell 10. Fuel inlet conduit 15 communicates through the enclosure 11 and has annular electric terminal 16 operatively attached thereto. In similar manner, fuel outlet conduit 17 communicates through enclosure 12 and has annular electric terminal 18 operatively connected thereto. Electrical conductive wires lead from terminal 16 and terminal 18 to a suitable circuit.

Figure 3:
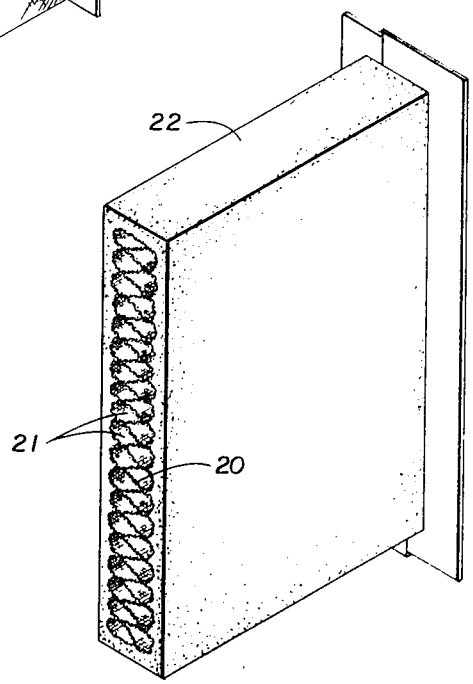
FIG. 3 is a perspective view of a matrix of this invention which is molded onto an electrode.

Now referring to FIGS. 2 and 3, electrodes 19 and 19a are identical and generally comprise a single sheet metal screen formed into a series of teardrop-shaped folds. The teardrop-shaped folds are held together by brazing or spot welding points of contact such as illustrated at points 20. This folded pattern allows reactive fuel to freely flow through spaces 21. Alternately a variety of other electrode structures can be utilized for electrodes 19 and 19a. For example, a coarse wire mesh similar to a kitchen scour pad can be used, or a number of cylindrical or tubular-shaped pieces stacked one on another can be used. Electrodes 19 and 19a can be made from a suitable anode material. For example, 80–100 mesh nickel screen.

Electrodes 19 and 19a carry matrices 22 and 22a respectively, molded around the outside periphery thereof as illustrated in FIG. 3. Matrices 22 and 22a are molded by the process of this invention which will described in detail below. These matrices are porous, crack-free ceramic bodies having high structural integrity and resistance to cracking and permanent distortion when subjected to temperature extremes.

Electrodes 23 and 23a are identical and each generally comprise two side sheet members held apart by two end channels, and a corrogated member welded therebetween. Electrodes 23 and 23a serve as the cathodes for fuel cell unit 10 and can be made of any suitable porous material known in the art such as 80–150 mesh silver plated stainless steel mesh screen, for example.

The electrical connections between the electrodes and electrical terminals 16 and 18 are illustrated in FIG. 2. Conductive end plate 24 is connected such as by welding with conductive enclosure 11. Slot 25 through conductive plate 24 communicates from chamber 13 to spaces 21 within the electrodes 19 and 19a. Likewise, conductive end plate 26 is connected such as by welding to conductive enclosure 12 and thereby communicates with electric terminal 18. Slot 27 communicates between chamber 14 and spaces 21 of electrodes 19a and 19. Electrodes 23 are operatively connected to conductive end plate 24 at points 28 while electrode 19 is spaced from and thereby insulated from conductive end plate 24. Electrode 19a is operatively connected to conductive end plate 26 while electrodes 23a are spaced and insulated from conductive end plate 26. Electrode 19 is operatively connected to electrodes 23a by flanges 29. In this arrangement electrodes 19 and 19a serve as dual anodes for two cells respectively. Additionally, electrodes 23 are connected in parallel, and electrodes 23a are connected in parallel by channels 30 and 30a, respectively (FIG. 1). As illustrated in FIG. 1, channels 30 and 30a are positioned over the top and the bottom of matrices 22 and 22a respectively, and electrodes 23 are operatively connected to channel 30 while electrodes 23a are operatively connected to channel 30a.

Fuel cell unit 10 will operate in any conventional manner. This particular system can effectively use various alkali metal carbonates as electrolytes. A preferred electrolyte is a eutectic mixture of sodium carbonate and lithium carbonate, e.g. 50 percent molar sodium carbonate and 50 percent molar lithium carbonate having a melting point of about 500° C. The matrices are initially impregnated with the electrolyte. Fuel cell unit 10 is placed within a suitable environment wherein an oxidizer reactant will continuously pass through electrodes 23 and 23a. Electrodes 19 and 19a are provided with a suitable fuel via inlet conduit 15 and chamber 13. Fuel cell unit 10 will function with a variety of reactants, but the preferred system is a fuel feed comprising hydrogen and oxidizer mixture comprising oxygen and carbon dioxide. The hydrogen can either be pure or mixed along with various other gases such as nitrogen, carbon dioxide, carbon monoxide, light hydrocarbons, water vapor, and the like. The oxygen can be either pure or supplied as air. Thus, fuel cell unit 10 is placed within a suitable heating device which is supplied with the above described oxidizer atmosphere and maintained at a temperature in the vicinity of 600° C., e.g. about 650° to 700° C. For example, placing fuel cell unit 10 within a ceramic wall oven (or other insulated casing means) which is provided with a gaseous flow of oxygen and carbon dioxide, or air in carbon dioxide in a direction parallel to electrodes 23 and 23a will suffice.

The hydrogen gas is then passed through inlet conduit 15, into chamber 13 and through slot 25, spaces 21 of electrodes 19 and 19a to chamber 14. The reaction occurring in electrodes 19 and 19a (the anodes) is as follows:

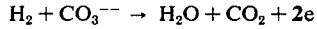
$$H_2 + CO_3^{--} \rightarrow H_2O + CO_2 + 2e$$

The oxygen and carbon dioxide which passes through the electrodes 23 and 23a and surrounds fuel cell unit 10 within the heating device will react as follows when contact is made with electrodes 23 and 23a:

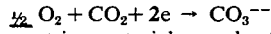
$$\tfrac{1}{2} O_2 + CO_2 + 2e \rightarrow CO_3^{--}$$

Conventional matrix materials made from particulate ceramic metal oxides such as magnesium oxide, aluminum oxide, and lithium aluminates and bound together by binders such as silicates, phosphates, aluminates, and fluorates, generally lose their structural integrity at least in part during prolonged periods of contact with the molten carbonate electrolyte at the elevated temperatures of fuel cell operation. This can result in non-uniform contact of an electrode by the electrolyte and ineffecient cell operation. Additionally, it has been found that if the matrix is thermal cycled in the range of about 900° C., the conventional matrices will crack and permanently distort. This thermal cycling occurs when practicing the process of my copending application, Ser. No. 806,838 filed Mar. 13, 1969 which discloses improved process for brazing fuel cell modules such as illustrated in the drawing by initially assembling the modules including the anodes carrying a matrix molded thereon by means of spot welding, applying a brazing material between the interconnected component parts and heating the temperature to a suitable brazing temperature, for example a temperature above 900° C. The conventional matrix material molded to the anodes in the assemblies generally will not stand the thermal cycling and will thereby crack or permanently distort.

The improved matrix of this invention on the other hand, will withstand prolonged conditions of high temperature fuel cell operation without substantial softening and deteriorating, and will withstand the thermal cycling operations such as described above without cracking or permanently distorting. The improved matrix of this invention is made from a major effective portion of a ceramic metal oxide, a minor effective portion of a conventional binder material, and a minor effective portion of a liquid phase sintering agent for the ceramic metal oxide. The particulate ceramic material, binder, and liquid phase sintering agent utilized in this invention can depend on such factors as the type of electrolyte, and the fuel cell operating conditions.

Suitable ceramic metal oxides include magnesium oxide, zirconium oxide, and lithium aluminate. From molten carbonate fuel cell operation the magnesium oxide is preferred. Suitable binders include phosphates, silicates, borates and aluminates. From molten carbonate fuel cell operation phosphate binders are preferred since they are substantially not reactive with the electrolyte. Particularly preferred for this application are the alkali metal phosphates. For example, sodium orthophosphate ($NaH_2PO_4$, $NaHPO_4$), sodium pyrophosphate ($Na_4P_2O$), sodium tripolyphosphate ($Na_5P_3O_{10}$), sequestered phosphate (glass) [$(NaPO_3)_x$ where $x = 6 - 8$], sodium hexametaphosphate [$(NaPO_3)_x$ where $x = 12 - 14$], and the like.

Any liquid phase sintering agent for the ceramic metal oxide can be used in the practice of this invention. The liquid phase sintering agent can yield either a reactive or non-reactive solid-liquid system. From magnesium oxide the preferred liquid phase sintering agents include lithium carbonate, lithium fluoride, lithium chloride, lithium bromide, lithium iodide and lithium sulphate.

To form the matrix of this invention, the three basic components are initially thoroughly admixed, generally in the presence of a small amount of a non-deleterious wetting agent such as water. The three components are generally in a powdered or particulate state. The particle size of ceramic metal oxide can vary according to the particular operation, but generally ranges from about 50 to about 400 mesh (U.S. standard). More preferably, the mesh size ranges from about 100 to about 325 (U.S. standard). Typical formulations of the ceramic metal oxide include from 30 to 50 weight percent in the 100 to 200 mesh range, and from 30 to 50 weight percent being smaller than 200 mesh. The binder and liquid phase sintering agent are generally in a particulate form sufficient to admix thoroughly with ceramic metal oxide particles.

The ceramic metal oxide generally comprises from about 80 to about 98 weight percent, preferably from 90 to 94 weight percent, on a dry weight basis, of the molding mixture. The binder and the liquid phase sintering agent each comprise from about 1 to about 10, preferably from about 2 to about 5 weight percent, on a dry weight basis, respectively, of the molding mixture. These compounds are generally thoroughly admixed with about 1 to 10 parts by weight of water or other non-deleterious wetting agent. It is generally preferred to initially thoroughly admix the ceramic metal oxide with liquid phase sintering agent in a dry state and then add the binder together with the water to form the molding composition. The composition is then molded into a suitable form such as that illustrated in FIG. 3 by conventional techniques. Any suitable matrix shape can be formed for any particular application, for example, a rectilinear shape molded on one side of an electrode.

Next the molded matrix is dried and cured for a sufficient time to remove the water therefrom and activate the binder. For most mixtures it is sufficient to cure the molded matrix from 1 to about 20 hours in an air atmosphere at a temperature in the range from about 80° to about 150° C.

After the above described curing step, a porous green mold is formed having substantial structural integrity at room temperatures. Thus, the molded matrix can be manipulated during fuel cell assembly or the like without the danger of distorting, softening or cracking. At this stage, the matrix is heated to a temperature well above the melting point of the liquid phase sintering agent (generally from 850° to 1,000° C.) to induce substantial sintering between the ceramic metal oxide particles. It is preferred to conduct this operation in the presence of a non-oxidizing atmosphere such as $H_2$ to prevent corrosion of the electrode material. The phenomena of liquid phase sintering is described in Chapter 16 of the book *Ceramic Fabrication Processes*, Technological Press of Massachusetts Institute of Technology and the John Wiley & Sons, Inc., New York, London (1958). This sintering process results in a stronger matrix than heretofore known in the art which will maintain its structural integrity under the above described thermal cycling conditions and under prolonged high temperature fuel cell operation conditions in the presence of reactive electrolyte.

The actual porosity of the particulate matrix can be varied as desired by such means as the size for the ceramic oxide particles. For example, consider the equation: $\gamma =$ one-half $hgdr$, where $\gamma =$ surface tension of a liquid; $h = $ *the height of the column of the liquid above the lower liquid level*; $g =$ acceleration due to gravity; $d =$ density of the liquid; and $r =$ radius of the capillary pore. By rearrangement of the equation, it can be seen that the capillary pore radius is directly proportional to the surface tension of the liquid and inversely proportional to the height of the column, the gravitational acceleration and the liquid density. Consequently, with proper sizing of the ceramic particles, the desired amount of capillarity can be obtained for a given electrolyte.

The following example is given for illustrative purposes to better facilitate the understanding of this invention:

EXAMPLE

A molding premix was initially obtained by thoroughly admixing 33.95 parts by weight of particulate magnesium oxide having a particle size of less than 200 mesh (U.S. standard), 14.55 parts by weight of particulate magnesium oxide having a particle size in the range of 100 to 200 mesh (U.S. standard), and 1.5 parts by weight of particulate lithium carbonate. To this molding premix was added 3 parts by weight of sequestered phosphate and 5.75 parts by weight of water to form a molding paste mixture.

Portions of this paste were molded to one side of an electrode such as illustrated in FIGS. 2 and 3, to form a uniform coat of about one thirty-second inch, and was aged an hour in air at room temperature. Next, the mixture was molded on the other side of the electrode to form a uniform coat of about one thirty-second inch, and the compositions on the two sides of the electrode were allowed to dry for an additional 3 hours at room temperature. After this, the molded matrix was oven dried. Side 1 was oven dried at 85° C. for 2 hours and Side 2 was oven dried at 85° C. for 1 hour. Next, both sides were oven dried at 120° C. for 16 hours.

After this initial curing operation, the matrix was dry and phosphate bonded sufficiently to give it good structural integrity at room temperature. The electrode carrying the matrix was then heated for 90 minutes at 900° C. in a hydrogen atmosphere. After this 90 minute period, the matrix was allowed to cool. No cracks were present. Additionally, the matrix surface on each side of the electrode was scratched. The matrix was found to be very strongly bonded together. This matrix performed well under conditions of fuel cell operation while impregnated with molten lithium carbonate electrolyte and maintained at 600° C. for several hours. After this time the matrix had not substantially softened and maintained excellent structural integrity and contact on the electrode to which it was molded.

While this invention has been described in reference to its preferred embodiments, it is to be understood that various modifications within this scope of the appended claims will not be apparent to one skilled in the art upon reading the specifications.

I claim:

1. A method of making a thermally stable, crack-resistant, porous matrix for holding electrolyte in a fuel cell comprising:

forming a mixture comprising a major effective portion of a particulate ceramic oxide, a minor effective portion of a binder for said particulate ceramic oxide, selected from inorganic phosphates, silicates, borates and aluminates, and a minor effective portion of a liquid phase sintering agent for said ceramic metal oxide;

molding said mixture to form a porous matrix and activating said binder to hold the molded mixture in a porous consolidated form of said matrix; and heating said porous consolidated form to a temperature above the melting point of said liquid phase sintering agent to thereby cause substantial sintering of said ceramic metal oxide particles.

2. The method of claim 1 wherein said ceramic metal oxide particles are magnesium oxide.

3. The method of claim 1 wherein said binder is an alkali metal phosphate.

4. The method of claim 3 wherein said liquid phase sintering agent is selected from lithium chloride, lithium bromide, lithium fluoride, lithium iodide, lithium carbonate and lithium sulphate.

5. The method of claim 4 wherein said mixture comprises from about 80 to about 98 parts by weight of said ceramic metal oxide, from about 1 to about 10 parts by weight of said binder, and from 1 to about 10 parts by weight of said liquid phase sintering agent.

6. The method of claim 4 wherein said mixture comprises from 90 to 94 parts by weight of said ceramic metal oxide, from 2 to 5 parts by weight of said binder, and from 2 to 5 parts by weight of said liquid phase sintering agent.

* * * * *